Patented Apr. 22, 1930

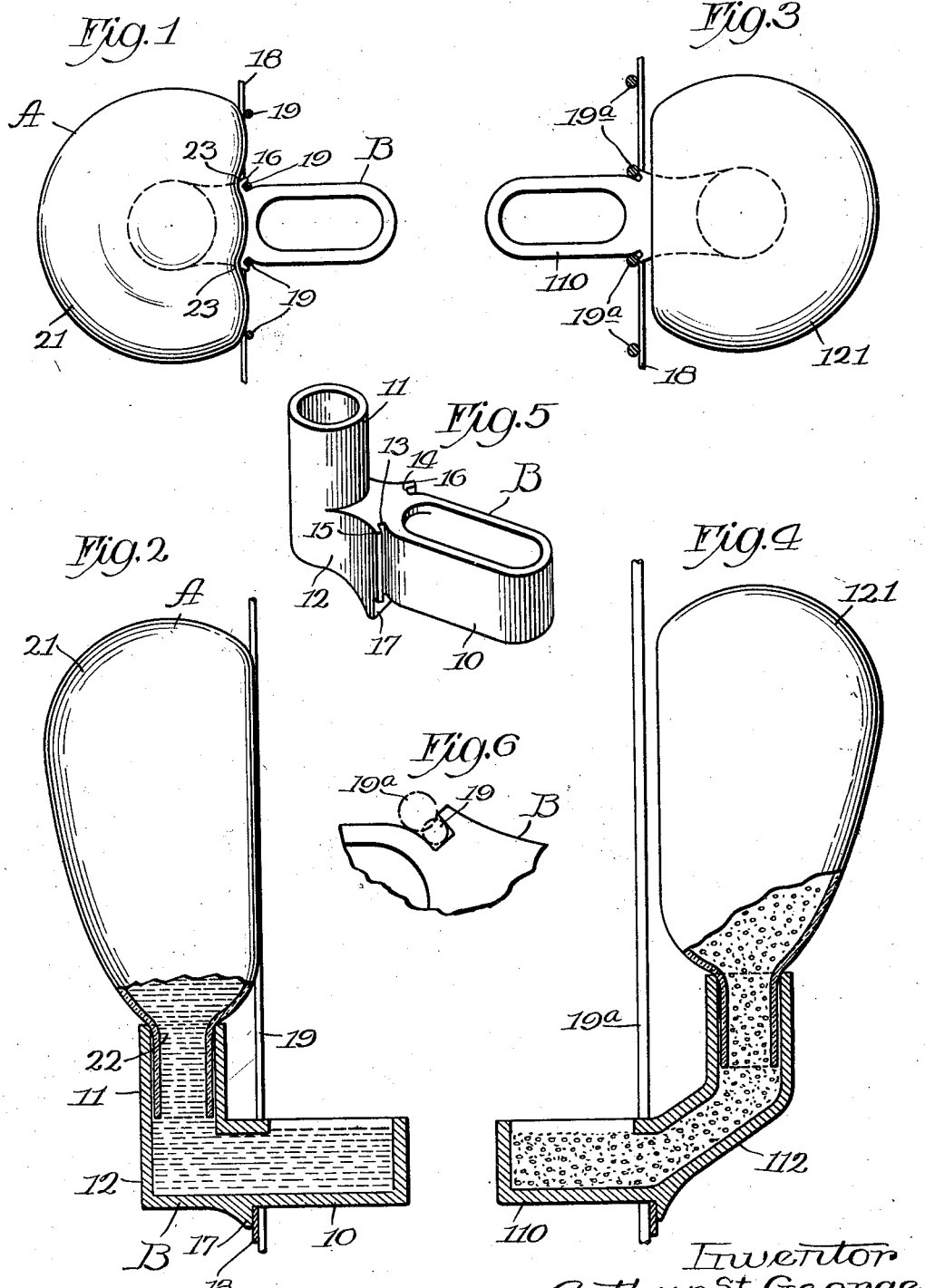

1,755,706

UNITED STATES PATENT OFFICE

ARTHUR ST. GEORGE, OF CHICAGO, ILLINOIS

BIRD FOUNTAIN

Application filed August 17, 1927. Serial No. 213,461.

My invention relates to a bird fountain for automatically supplying food and water to a caged bird from a reservoir or source of supply thereof.

The ordinary food and water cups for caged song birds and the like, contain only enough nourishment to supply the bird for a short length of time. Any unusual absence from the home therefore makes it necessary to take special precautions to feed and water the bird.

I am aware that several different fountains designed to supply this need have been produced but these fountains have not been successful and the public has not taken to them. The reason possibly is that they are large and cumbersome, difficult to adjust, form an unsightly appearance and only imperfectly perform the function for which they are designed.

The principal object of my invention is to provide an improved bird fountain.

Another object is to provide a bird fountain which will have a neat attractive appearance when used on the cage.

Another object is to provide a bird fountain which is easily applied to the cage.

Another object is to provide a bird fountain adapted for use with any standard type of cage, and easily applied thereto independent of the thickness of the bars.

Another object is to provide a bird fountain which will operate reliably under all circumstances.

Another object is to provide a bird fountain of simplified design.

The bird fountain of my invention is of considerably smaller size than the fountains heretofore known and is arranged so that the weight is distributed almost directly above the center of support. A single pair of vertical side grooves is provided, so constructed that they will actuate on either large or small diameter bars, while a shoulder in back of each slot limits the degree of insertion of the fountain between the bars. A downwardly extending projection on the bottom of the fountain is adapted to rest against the transverse space rod connected to the upright bars to further support the weight of the fountain.

Other objects and features of the invention will be apparent from a consideration of the detailed description taken with the accompanying drawings, wherein Fig. 1 is a plan view of one form of the fountain, with the wire bars to which it is secured shown in section;

Fig. 2 is an elevational view partially in section of the fountain shown in Fig. 1;

Fig. 3 is a plan view of a modified form;

Fig. 4 is an elevational view thereof partly sectioned;

Fig. 5 is a perspective view of the fountain bracket shown in Figs. 1 and 2, and Fig. 6 is a fragmentary schematic representation showing the manner in which the fountain bracket is secured to cages with different diameter bars.

The fountain comprises two main portions, namely a fountain head A preferably made of transparent glass and a fountain bracket B formed from a suitable metal. The bracket portion is adapted to be secured to the cage, while the fountain head A simply rests on the bracket and serves as a reservoir for supplying water or feed to the fountain bracket.

Referring first to Figs. 1, 2 and 5, the fountain bracket comprises a trough 10, an upright cylindrical portion 11 for receiving the fountain head and a connecting bracket 12 which is provided with any suitable opening to furnish a continuous passageway from the neck through to the trough. Between the trough and connecting portion 12 is provided a pair of vertical slots 13 and 14 having in immediate association therewith, shoulders 15 and 16. The shoulders form one side of the slot and project slightly farther outward beyond the lateral wall of the trough. Immediately adjacent the slots and on the underside of the connecting portion, is a downward projection 17 adapted to rest against a transverse bar 18 which reinforces and spaces the vertical cage bars 19.

The head A is provided with a main body portion 21 of general pear shape, with a neck 22 open at the bottom to furnish the only opening in the walls of the fountain head.

On the side of the head, adjacent the bars, the body is provided with longitudinal continuous recesses 23—23 which are so arranged that the bars of the cage will lie therein and allow a portion of the body to belly out slighty between them.

When using the bird fountain, the body of the fountain head is filled with seed or water, as the case may be. The fountain bracket is applied thereto while the neck portion is upright and the assemblied fountain reversed so that the material in the body portion of the head will flow downwardly into the trough. The bracket is then grasped by the connecting portion 12 and the trough inserted between the vertical bars of the cage until they strike the shoulders 15 and 16. The insertion is made above the spacer rod 18 so that there is plenty of give to the bars. When complete insertion has been made, the entire fountain is allowed to slide downwardly until the underside of the trough rests upon the top of the spacer 18 and the projection 17 bears against the outside edge thereof. As the bird consumes the material in the trough, it will gradually be fed downwardly to replenish the same until the source of supply in the fountain head is exhausted.

The modified form shown in Figs. 3 and 4 is substantially the same as the form shown in Figs. 1, 2 and 5. The reference characters are the same except that they are prefixed with the numeral 1, the trough being designated 110 etc. The only distinction in this form is that the connecting portion 112 is curved upwardly and is somewhat longer than the connecting portion 12 shown in the main form. The fountain head is spaced outwardly from the cage bars a slight distance but still is substantially above the center of support.

In actual practice, I employ the form shown in Figs. 1, 2 and 5 for supplying water to the bird while the form shown in Figs. 3 and 4 is used for feed. The water is heavier and for this reason the arrangement is such that the weight is as near as possible above the support.

In this form, the fountain bracket is preferably made of pure iron which is absorbed sufficiently by the water to serve as a tonic for the bird. The outside of the bracket is of course finished with a silver or nickle coating or any species of coating for presenting a nice appearance. If it is desired, the fountain can be constructed in the main of a non-ferrous metal with a strip of iron included on the inside in contact with the water to obtain tonic iron. But the simplest method is to construct the entire bracket of iron and refinish its exterior.

In the form shown in Figs. 3 and 4, the bracket is preferably constructed of a light metal such as aluminum-alloy. Since the seeds flow down a little more reluctantly than the water, the curve in the neck or connecting portion is of great advantage in maintaining a continuous flow of seeds. The relatively light weight of the seeds makes this arrangement easily possible where such a long connecting portion might not give such good results with a heavy water-filled fountain head.

The fountain is primarily designed to be secured to the usual small wire cages but as shown in Fig. 6, it may be uesd with so called "ivory" cages having relatively large vertical bars 19ª. These bars fit in the vertical grooves or slots substantially in the manner shown in Fig. 6. They also are engaged by the shoulders 15 and 16 when the fountain is placed in position.

When the fountain is used with water, it is not necessary to supply any kind of a washer as a seal between the glass and metal of the fountain bracket. Apparently the surface tension in this relatively small space is sufficient to effectively seal this opening. It is apparent then that the water comes in contact only with the clean glass of the fountain head and the tonic iron of the bracket, there being no injurious substance such as rubber or the like which might impair the health of the bird.

Although I have described a specific embodiment of my invention what I claim as new and desire to protect by Letters Patent of the United States is:

A bird fountain adapted to be supported by the bars of a cage, said fountain comprising a fountain head adapted to serve as a reservoir, and a fountain bracket having a single pair of vertical grooves adapted to receive and hold large or small diameter bars, and means associated with the grooves for limiting the degree of insertion of the bracket so that it cannot be extended inwardly beyond said grooves.

In witness whereof, I hereunto subscribe my name this 1st day of August, 1927.

ARTHUR ST. GEORGE.